(12) United States Patent
Yoshida et al.

(10) Patent No.: US 12,315,948 B2
(45) Date of Patent: May 27, 2025

(54) POWER SUPPLY DEVICE AND VEHICLE AND POWER STORAGE DEVICE HAVING SAME

(71) Applicant: SANYO Electric Co., Ltd., Osaka (JP)

(72) Inventors: Naotake Yoshida, Hyogo (JP); Eri Kohira, Hyogo (JP); Kazuhiro Harazuka, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 320 days.

(21) Appl. No.: 17/906,352

(22) PCT Filed: Dec. 22, 2020

(86) PCT No.: PCT/JP2020/047899
§ 371 (c)(1),
(2) Date: Sep. 15, 2022

(87) PCT Pub. No.: WO2021/199535
PCT Pub. Date: Oct. 7, 2021

(65) Prior Publication Data
US 2023/0140244 A1 May 4, 2023

(30) Foreign Application Priority Data
Mar. 31, 2020 (JP) .................. 2020-064062

(51) Int. Cl.
*H01M 50/24* (2021.01)
*B60K 1/04* (2019.01)
(Continued)

(52) U.S. Cl.
CPC .............. *H01M 50/24* (2021.01); *B60K 1/04* (2013.01); *B60L 53/60* (2019.02);
(Continued)

(58) Field of Classification Search
CPC .. H01M 50/24; H01M 50/209; H01M 50/264; H01M 2220/20; B60L 53/60; B60K 1/04
See application file for complete search history.

(56) References Cited

U.S. PATENT DOCUMENTS 9,865,898 B2 * 1/2018 Sera ...................... H01M 50/24
10,483,509 B2 * 11/2019 Kakimura ................ B60K 1/04
(Continued)

FOREIGN PATENT DOCUMENTS

| CN | 206800829 U | 12/2017 |
| CN | 110088936 A | 8/2019 |

(Continued)

OTHER PUBLICATIONS

International Search Report of PCT application No. PCT/JP2020/047899 dated Feb. 22, 2021.
(Continued)

*Primary Examiner* — John D Walters
(74) *Attorney, Agent, or Firm* — WHDA, LLP

(57) ABSTRACT

Power supply device includes: battery stack in which a plurality of battery cells each having electrode terminal formed on a top surface thereof are stacked; a pair of end plates respectively covering end surfaces in a stacking direction of battery stack; fastening member that fastens the pair of end plates to each other; and insulating member interposed between a side surface of battery stack and fastening member. Insulating member has groove extending in a stacking direction of battery stack on a surface facing battery stack.

10 Claims, 8 Drawing Sheets

(51) Int. Cl.
*B60L 53/60* (2019.01)
*H01M 50/209* (2021.01)
*H01M 50/264* (2021.01)

(52) U.S. Cl.
CPC ....... *H01M 50/209* (2021.01); *H01M 50/264* (2021.01); *H01M 2220/20* (2013.01)

(56) References Cited

U.S. PATENT DOCUMENTS 12,036,878 B2 * 7/2024 Uemura .............. H01M 50/209
2015/0132634 A1 5/2015 Sera et al.

FOREIGN PATENT DOCUMENTS

| | | |
|---|---|---|
| JP | 2012-094376 | 5/2012 |
| JP | 2019-075245 | 5/2019 |
| JP | 2019-192536 | 10/2019 |
| WO | 2013/179796 | 12/2013 |
| WO | 2014/109034 | 7/2014 |

OTHER PUBLICATIONS

English Translation of Search Report dated Jun. 29, 2024 issued in counterpart CN Application No. 202080097784.8 (3 pages).

* cited by examiner

POWER SUPPLY DEVICE AND VEHICLE AND POWER STORAGE DEVICE HAVING SAME

CROSS-REFERENCE TO RELATED APPLICATIONS

This application is a U.S. national stage application of the PCT International Application No. PCT/JP2020/047899 filed on Dec. 22, 2020, which claims the benefit of foreign priority of Japanese patent application No. 2020-064062 filed on Mar. 31, 2020, the contents all of which are incorporated herein by reference.

TECHNICAL FIELD

The present disclosure relates to a power supply device, and vehicle and a power storage device each equipped with the power supply device.

BACKGROUND ART

A power supply device is used as a power supply device for driving an electric vehicle, a power supply device for power storage, or the like. In such a power supply device, a plurality of chargeable and dischargeable battery cells are stacked, the plurality of battery cells are connected in series or in parallel, and electric power is extracted from a total output terminal.

Since the power supply device is used in various environments, water may enter the power supply device. Even when an outer covering case having high sealability is used, dew condensation water may be generated in the outer covering case due to a temperature difference. When water accumulates inside the power supply device, there is a possibility that a short circuit occurs between the battery cells having a potential difference via water.

In such a power supply device, it is necessary to prevent unintended conduction due to dew condensation, water entered from the outside, or the like. In particular, in a power supply device constituting a battery stack in which a large number of battery cells are stacked, a structure for avoiding a liquid junction is required to enhance safety.

CITATION LIST

Patent Literature

PTL 1: WO 2013/179796 A

SUMMARY OF THE INVENTION

An object of one aspect of the present invention is to provide a power supply device in which unintended conduction hardly occurs even when dew condensation occurs, a vehicle and a power storage device including the power supply device.

A power supply device according to an aspect of the present invention is a power supply device including: a battery stack body in which a plurality of battery cells are stacked, each of the battery cells including an electrode terminal formed on a top surface of the battery cell; a pair of end plates that respectively cover respective end surfaces in a stacking direction of the battery stack; a fastening member that fastens the pair of end plates to each other; and an insulating member interposed between a side surface of the battery stack and the fastening member, wherein the insulating member includes a groove extending in the stacking direction of the battery stack on a surface facing the battery stack.

According to a power supply device according to an aspect of the present invention, even when dew condensation water is generated, drainage can be urged by a groove provided in an insulating member.

DESCRIPTION OF EMBODIMENT

Figure 1:
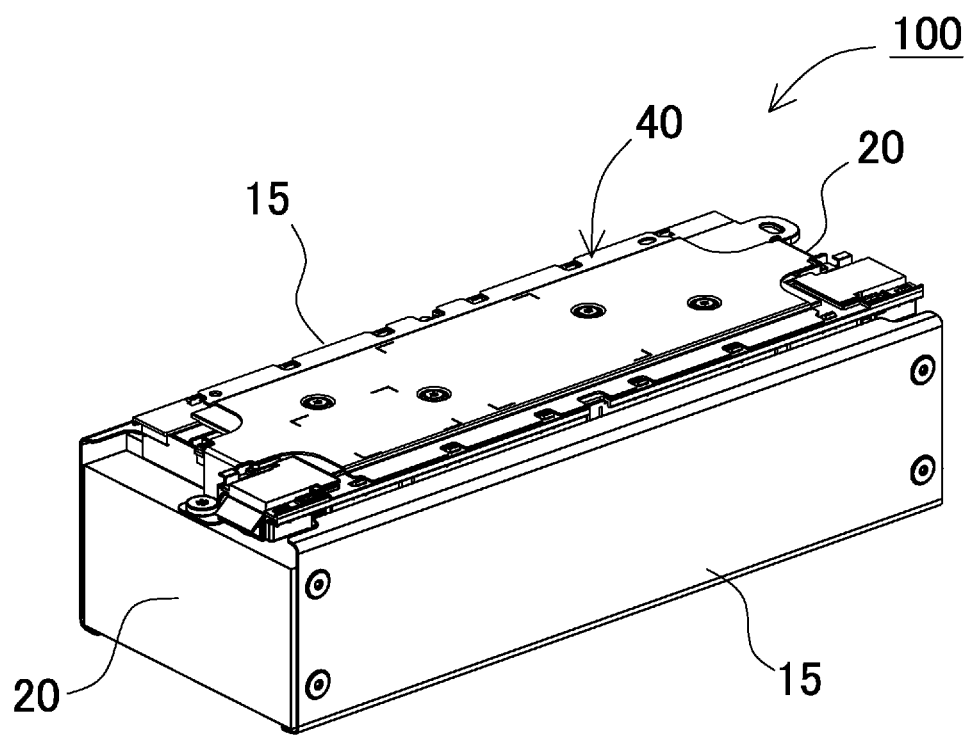
FIG. 1 is a perspective view illustrating a power supply device according to a first exemplary embodiment of the present invention.

Exemplary embodiments of the present invention may be specified by the following configurations.

In a power supply device according to an exemplary embodiment of the present invention, in addition to the above configuration, the groove is a groove including a width in which dew condensation water is sucked due to a capillary phenomenon. With the above configuration, when dew condensation water is generated, the dew condensation water is guided to the groove by the capillary phenomenon, and drainage of the dew condensation water can be promoted.

In the power supply device according to another exemplary embodiment of the present invention, in addition to any of the above configurations, the groove is a groove including a width of 0.01 mm to 1.0 mm.

In the power supply device according to another exemplary embodiment of the present invention, in addition to any of the configurations described above, the insulating member includes a water-repellent coating film on a part or an entire surface of the insulating member.

In the power supply device according to another exemplary embodiment of the present invention, in addition to any of the configurations described above, the groove includes a step formed toward an opening surface of the groove shape in a cross-sectional view orthogonal to an extending direction of the groove shape.

In the power supply device according to another exemplary embodiment of the present invention, in addition to any of the configurations described above, the groove includes both ends, at least one of both the ends including a shape that expands toward a discharge direction.

In the power supply device according to another exemplary embodiment of the present invention, in addition to any of the configurations described above, the insulating member includes a flat plate covering a side surface of the battery stack and a covering part covering a bottom surface of the battery stack, and the flat plate and the covering part extend in the stacking direction of the battery stack, and the groove is provided on a surface of the covering part facing the battery stack.

In the power supply device according to another exemplary embodiment of the present invention, in addition to any of the configurations described above, the insulating member includes a flat plate covering a side surface of the battery stack and a covering part covering a bottom surface of the battery stack, and the flat plate and the covering part extend in the stacking direction of the battery stack, and the groove is provided on a surface of the flat plate facing the battery stack.

In the power supply device according to another exemplary embodiment of the present invention, in addition to any of the above configurations, the groove is formed in a linear shape inclined with respect to an extending direction of the flat plate.

A vehicle according to still another exemplary embodiment of the present invention is a vehicle including any of the above power supply devices, the power supply device, a motor for traveling that is supplied with electric power from the power supply device, a vehicle body on which the power supply device and the motor are mounted, and wheels that are driven by the motor to cause the vehicle body to travel.

A power storage device according to still another exemplary embodiment of the present invention is a power storage device including any of the above power supply devices, the power supply device, and a power supply controller that controls charging and discharging of the power supply device, wherein the power supply controller enables charging of each of the battery cells with electric power from an outside and controls charging to the battery cell.

Exemplary embodiments of the present invention will be hereinafter described with reference to the drawings. However, the exemplary embodiments described below are examples for embodying the technical idea of the present invention, and the present invention is not limited to the exemplary embodiments described below. Further, in the present specification, members indicated in the claims are not limited to the members of the exemplary embodiments. In particular, the dimensions, materials, shapes, and the relative arrangement of the constituent members described in the exemplary embodiments are not intended to limit the scope of the present invention only thereto unless otherwise specified and are merely illustrative examples. Note that the sizes and positional relationships of the members illustrated in the drawings may be exaggerated for clarity of description. Further, in the following description, the same names and marks indicate the same or similar members, and detailed description will be appropriately omitted. Furthermore, the elements constituting the present invention may be configured such that a plurality of elements are constituted of the same member to form one member that functions as the plurality of elements, or conversely, a function of one member can be shared and achieved by a plurality of members. In addition, the description in some examples or exemplary embodiments may be applied to other examples, exemplary embodiments, and the like.

The power supply device according to the exemplary embodiments is used in various applications including a power source to be equipped on a hybrid automobile, an electric automobile, or other electric vehicles to supply electric power to a drive motor, a power source that stores power generated by natural energy such as solar power generation and wind power generation, and a power source for storing midnight electric power, and in particular, used as a power source suitable for large-power, large-current applications. In the following example, the exemplary embodiments applied to a power supply device for driving an electric vehicle will be described.

Exemplary embodiments of the present invention will be hereinafter described with reference to the drawings. However, the exemplary embodiments described below are examples for embodying the technical idea of the present invention, and the present invention is not limited to the exemplary embodiments described below. Further, in the present specification, members indicated in the claims are not limited to the members of the exemplary embodiments. In particular, the dimensions, materials, shapes, and the relative arrangement of the constituent members described in the exemplary embodiments are not intended to limit the scope of the present invention only thereto unless otherwise specified and are merely illustrative examples. Note that the sizes and positional relationships of the members illustrated in the drawings may be exaggerated for clarity of description. Further, in the following description, the same names and marks indicate the same or similar members, and detailed description will be appropriately omitted. Furthermore, the elements constituting the present invention may be configured such that a plurality of elements are constituted of the same member to form one member that functions as the plurality of elements, or conversely, a function of one member can be shared and achieved by a plurality of members. In addition, the description in some examples or exemplary embodiments may be applied to other examples, exemplary embodiments, and the like.

The power supply device according to the exemplary embodiments is used in various applications including a power source to be equipped on a hybrid automobile, an electric automobile, or other electric vehicles to supply electric power to a drive motor, a power source that stores power generated by natural energy such as solar power generation and wind power generation, and a power source for storing midnight electric power, and in particular, used as a power source suitable for large-power, large-current applications. In the following example, the exemplary embodiments applied to a power supply device for driving an electric vehicle will be described.

First Exemplary Embodiment

Power supply device 100 according to the first exemplary embodiment of the present invention is illustrated in FIGS.

Figure 2:
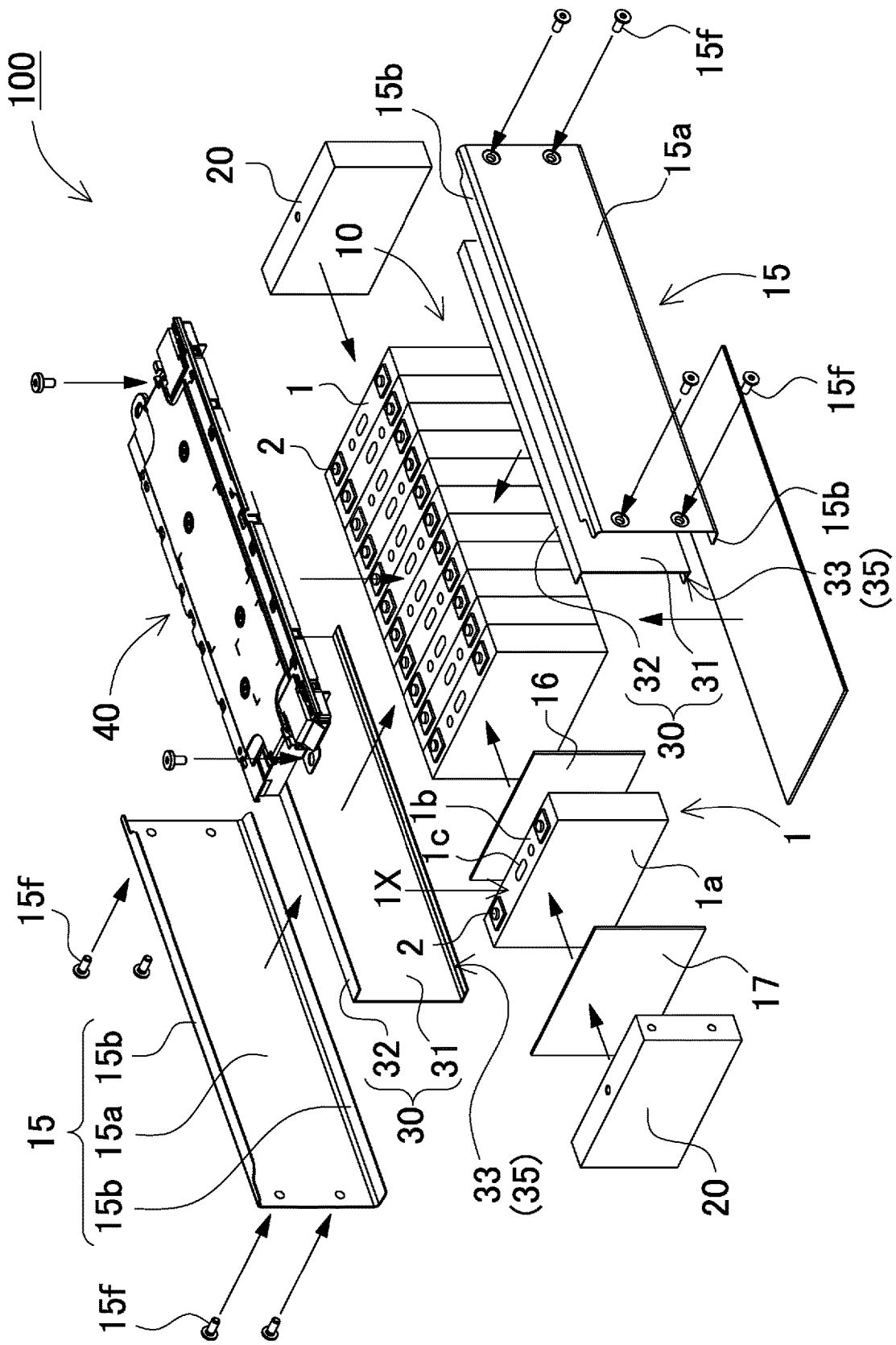
FIG. 2 is an exploded perspective view of the power supply device illustrated in FIG. 1.

1 and 2. In these figures, FIG. 1 is an exploded perspective view of power supply device 100 according to the first exemplary embodiment, and FIG. 2 is an exploded perspective view of power supply device 100 illustrated in FIG. 1.

Power supply device 100 illustrated in these figures includes battery stack 10 in which a plurality of battery cells 1 are stacked, a pair of end plates 20 covering both side end surfaces of battery stack 10, a plurality of fastening members 15 that fasten end plates 20 to each other, cover assembly 40 provided on a top surface of battery stack 10, and insulating member 30.

Each of fastening members 15 is formed into a plate shape extending in a stacking direction of the plurality of battery cells 1. Fastening members 15 are disposed on opposite side surfaces of battery stack 10, respectively, to fasten end plates 20 to each other.

(Battery Stack 10)

As illustrated in FIG. 2, battery stack 10 includes the plurality of battery cells 1 each including positive and negative electrode terminals 2, and bus bars connected to electrode terminals 2 of the plurality of battery cells 1 to connect the plurality of battery cells 1 in parallel and in series. The plurality of battery cells 1 are connected in parallel and in series through the bus bars. Battery cells 1 are chargeable and dischargeable secondary batteries. Power supply device 100 includes the plurality of battery cells 1 connected in parallel to form a parallel battery group, and a plurality of the parallel battery groups are connected in series to allow a number of battery cells 1 to be connected in parallel and in series. In power supply device 100 illustrated in FIG. 2, the plurality of battery cells 1 are stacked to form battery stack 10. Further, the pair of end plates 20 is disposed on both end surfaces of battery stack 10. End parts of fastening members 15 are fixed to end plates 20, and battery cells 1 in a stacked state are fixed in a pressed state.

(Battery Cell 1)

As illustrated in FIG. 2, each of battery cells 1 is a prismatic battery having a width larger than the thickness, in other words, a prismatic battery thinner than the width, and the plurality of battery cells are stacked in a thickness to form battery stack 10. Each of battery cells 1 can be, for example, a lithium ion secondary battery. Further, the battery cell can be any chargeable secondary battery such as a nickel metal hydride battery and a nickel cadmium battery. Battery cell 1 houses positive and negative electrode plates in outer covering can 1a having a sealed structure together with an electrolyte solution. Exterior can 1a includes a metal sheet such as aluminum or an aluminum alloy press-molded into a prismatic shape, and has an opening that is hermetically sealed with sealing plate 1b. Sealing plate 1b is made of the aluminum or aluminum alloy same as prismatic outer covering can 1a, and positive and negative electrode terminals 2 are fixed to both ends of sealing plate 1b. Sealing plate 1b is provided with, between positive and negative electrode terminals 2, gas discharge valve 1c, which is a safety valve that opens in response to a change in pressure inside each battery cell 1.

The plurality of battery cells 1 are stacked such that the thickness of each battery cell 1 aligns in the stacking direction to constitute battery stack 10. At this time, the power of battery stack 10 can be increased by making the number of the battery cells stacked larger than usual. In such a case, battery stack 10 is long extended in the stacking direction. In battery cells 1, terminal surfaces 1X on which positive and negative electrode terminals 2 are provided are disposed on the same plane, and the plurality of battery cells 1 are stacked to form battery stack 10. The top surface of battery stack 10 is a surface on which gas discharge valves 1c of the plurality of battery cells 1 are provided.

(Electrode Terminal 2)

In battery cell 1, as illustrated in FIG. 2 and the like, with sealing plate 1b, which is a top surface, as terminal surface 1X, positive and negative electrode terminals 2 are fixed to both ends of terminal surface 1X. Electrode terminal 2 has a protrusion having a circular columnar shape. However, the protrusion is not necessarily in a circular columnar shape and may be in a polygonal columnar shape or an elliptic columnar shape.

Positive and negative electrode terminals 2 fixed to sealing plate 1b of battery cell 1 are positioned where the positive electrode and the negative electrode become bilaterally symmetrical. Consequently, as illustrated in FIG. 2, battery cells 1 are flipped left and right and stacked, and electrode terminals 2 of a positive electrode and a negative electrode that are adjacently close to each other are connected by a bus bar, so that adjacent battery cells 1 can be connected in series. Note that the present invention does not specify the number and connection state of the battery cells constituting the battery stack. The number and connection state of the battery cells constituting the battery stack may be modified in various manners, inclusive of other exemplary embodiments described later.

The plurality of battery cells 1 are stacked such that the thickness of each battery cell 1 aligns in the stacking direction to constitute battery stack 10. In battery stack 10, the plurality of battery cells 1 are stacked such that terminal surface 1X provided with positive and negative electrode terminals 2 and sealing plate 1b in FIG. 2 become flush with each other.

In battery stack 10, insulating spacer 16 may be interposed between battery cells 1 stacked adjacently to each other. Insulating spacer 16 is made of an insulating material such as resin in the form of a thin plate or sheet. Insulating spacer 16 has a plate shape having substantially the same size as a facing surface of battery cell 1. Insulating spacer 16 can be stacked between adjacent battery cells 1 to insulate adjacent battery cells 1 from each other. Note that, as a spacer disposed between adjacent battery cells, a spacer having a shape in which a flow path of a cooling gas is formed between the battery cell and the spacer can also be used. In addition, the surface of the battery cell can be covered with an insulating material. For example, the surface of the outer covering can excluding the electrode terminal part of the battery cell may be covered with a shrink film such as a PET resin. In this case, the insulating spacer may be omitted. Further, although a power supply device including a large number of battery cells connected in parallel and series includes an insulating spacer interposed between the battery cells connected in series to each other, no voltage difference occurs between adjacent outer covering cans in the battery cells connected in parallel to each other, and therefore the insulating spacer between these battery cells can be eliminated.

Furthermore, power supply device 100 illustrated in FIG. 2 includes end plates 20 disposed on both end surfaces of battery stack 10. Note that end surface spacer 17 may be interposed between each of end plates 20 and battery stack 10 to insulate the end plate and the battery stack from each other. End surface spacer 17 can also be produced in the form of a thin plate or sheet with an insulating material such as resin.

In power supply device 100 according to the first exemplary embodiment, in battery stack 10 in which the plurality of battery cells 1 are stacked on each other, electrode terminals 2 of the plurality of battery cells 1 adjacent to each other are connected by the bus bar to connect the plurality of battery cells 1 in parallel and in series. Further, a bus bar holder may be disposed between battery stack 10 and the bus bars. Use of the bus bar holder makes it possible to dispose the plurality of bus bars at fixed positions on the top surface of the battery stack while insulating the plurality of bus bars from each other and insulating the terminal surfaces of the battery cells from the bus bars. Furthermore, cover assembly 40 described later may be integrated with the bus bar holder.

The bus bar is manufactured into a predetermined shape by cutting and processing a metal sheet. As the metal sheet configuring the bus bar, metal that is low in electrical resistance and light in weight, such as an aluminum sheet, a copper sheet, or an alloy of these metals can be used. However, as the metal sheet for the bus bar, other metals that are low in electrical resistance and light in weight or an alloy of them can be used.

(End Plate 20)

As illustrated in FIG. 2, end plates 20 are disposed at both ends of battery stack 10 and fastened via the pair of right and left fastening members 15 disposed along both side surfaces of battery stack 10. End plates 20 are disposed at both ends of battery stack 10 in the stacking direction of battery cells 1 and outside end surface spacers 17 to sandwich battery stack 10 from both ends.

(Fastening Member 15)

Each of fastening members 15 has both ends fixed to end plates 20 disposed on both end surfaces of battery stack 10. As illustrated in FIG. 2 and the like, fastening members 15 are each made of metal having a predetermined width and a predetermined thickness along the side surface of battery stack 10, and are disposed to face both the side surfaces of battery stack 10. As each of fastening members 15, a metal sheet such as iron, preferably a steel plate can be used. Fastening member 15 made of a metal sheet is bent by press molding or the like to be formed into a predetermined shape.

Fastening member 15 has an upper and lower parts of plate-shaped fastening main surface 15a bent in a U-shape to form bent pieces 15b. Upper and lower bent pieces 15b cover upper and lower surfaces of battery stack 10 from the corners on the right and left side surfaces of battery stack 10. Fastening member 15 is fixed to outer peripheral surfaces of end plates 20 by screwing bolts 15f into a plurality of fastening screw holes opened in fastening main surface 15a. Note that fastening main surface 15a and end plate 20 are not necessarily fixed by screwing with bolts, and may be fixed with pins, rivets, or the like.

Power supply device 100 in which a large number of battery cells 1 are stacked is configured to bind the plurality of battery cells 1 by connecting end plates 20 disposed at both ends of battery stack 10 including the plurality of battery cells 1 by fastening members 15. By binding the plurality of battery cells 1 via end plates 20 and fastening members 15 having high rigidity, it is possible to suppress expansion, deformation, relative movement, malfunction due to vibration, and the like of battery cells 1 due to charging and discharging, and degradation.

(Cover Assembly 40)

Power supply device 100 is provided with cover assembly 40 on the top surface of battery stack 10. Cover assembly 40 configures a gas discharge path for discharging a high-temperature, high-pressure gas to the outside of power supply device 100 when this gas is discharged from any of battery cells 1 constituting battery stack 10. Note that cover assembly 40 may also be configured to serve as a bus bar holder that holds the bus bars.

(Insulating Member 30)

Further, insulating member 30 is interposed between fastening member 15 and battery stack 10. Insulating member 30 is bent so as to cover from the side surface to a part of the bottom surface of battery stack 10. Insulating member 30 is made of a material having insulating properties, such as a resin or the like, and insulates between fastening member 15 made of metal and the battery cells. Insulating member 30 illustrated in FIG. 2 and the like is constituted of flat plate 31 that covers the side surface of battery stack 10, and covering parts 32 provided above and below flat plate 31. Flat plate 31 has a plate shape extended in the stacking direction of battery stack 10. Each of covering parts 32 is bent from flat plate 31 to cover a part of a bottom surface of battery stack 10.

Insulating member 30 is interposed between battery stack 10 and fastening member 15, but is not necessarily in close contact with battery stack 10 or fastening member 15. When dimensional tolerance is set in consideration of assemblability, a gap is generated between insulating member 30 and battery stack 10. In this state, moisture contained in the air interposed in the gap may be condensed due to a temperature difference. In particular, when dew condensation water is generated between battery stack 10 and fastening member 15, the dew condensation water is accumulated in the power supply device if the dew condensation water cannot be discharged to the outside of the power supply device. The dew condensation water accumulated in this part reaches near a top surface along a slight gap between the battery stack and the insulating member, and there is a high possibility of occurrence of so-called liquid junction in which an electrode terminal provided on the top surface of the battery cell is electrically connected to another conductive member or the like.

(Groove 33)

Therefore, in power supply device 100 according to the present exemplary embodiment, attention is paid to a structure for efficiently draining the generated dew condensation water to the outside of the power supply device instead of preventing the generation of the dew condensation water itself. That is, if the generated dew condensation water can be discharged faster than the speed at which the dew condensation water is generated, a risk of the liquid junction can be reduced. Here, groove 33 for discharging dew condensation water generated between battery stack 10 and fastening member 15 to the outside of the power supply device is provided in insulating member 30 with insulation interposed between the side surface of battery stack 10 and fastening member 15.

Generally, a gap is not generated as long as the fastening member and the insulating member can be completely brought into close contact with each other. However, since fastening member 15 and insulating member 30 have a flat plate shape, it is difficult to completely bring the fastening member and the insulating member into close contact with each other due to dimensional tolerance and assemblability. In particular, when there is a slight gap, there is a possibility that electrode terminal 2 on the top surface is reached along insulating member 30 due to a capillary phenomenon. Therefore, in power supply device 100 according to the present exemplary embodiment, insulating member 30 is configured to promote drainage of dew condensation water by forming groove 33 in a part of a surface in contact with battery stack 10. Since power supply device 100 according to the present exemplary embodiment has groove 33 as a path for guiding dew condensation water, it is possible to prevent electrode terminal 2 on the top surface of the battery cell from being reached through an unintended path. In particular, a width of groove 33 is preferably a width at which a capillary phenomenon occurs. Narrow groove 33 can also be expected to have an effect of sucking dew condensation water by a capillary phenomenon. For example, the width of the groove is set to 0.01 mm to 1.0 mm. Note that groove 33 is provided so as to provide a route that causes no problem even when dew condensation water is transferred, and is configured such that the induced dew condensation water is drained to the outside of the power supply device.

Figure 3:
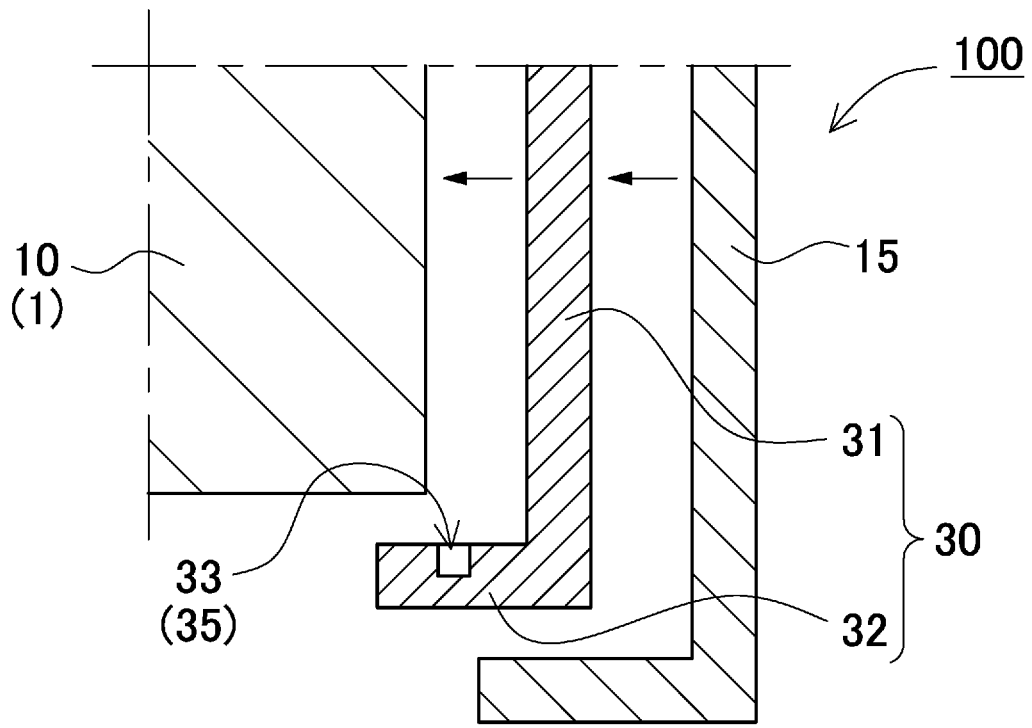
FIG. 3 is an enlarged schematic cross-sectional view illustrating an interface between a battery stack and an insulating member of the power supply device according to the first exemplary embodiment.

In an example illustrated in a schematic cross-sectional view of FIG. 3, groove 33 is formed in covering part 32. Groove 33 is formed in a length direction of covering part 32. As described above, in the case where insulating member 30 includes flat plate 31 and covering part 32, the shape is bent so as to cover from the side surface to a part of the bottom surface of battery stack 10, and dew condensation water easily accumulates in covering part 32. However, with the configuration illustrated in FIG. 3, dew condensation water generated near covering part 32 can be drained to the outside of the power supply device, and dew condensation water can be prevented from accumulating in covering part 32. Accordingly, it is possible to suppress a situation in which dew condensation water accumulated in the vicinity of covering part 32 is sucked up by the gap between the side surface of the battery stack and insulating member 30 and is propagated near the top surface of battery cell 1. As a result, it is possible to avoid a situation in which electrode terminal 2 provided on the top surface of battery cell 1 is liquid-connected to another conductive part due to dew condensation water.

Second Exemplary Embodiment

Figure 4:
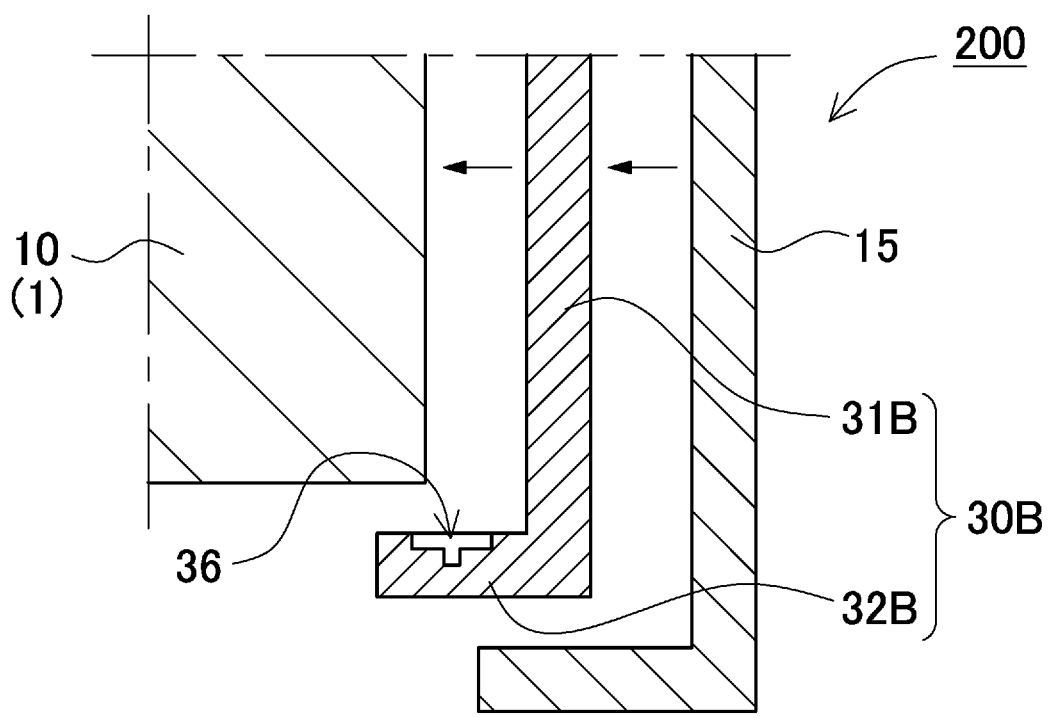
FIG. 4 is an enlarged schematic cross-sectional view illustrating an interface between a battery stack and an insulating member of a power supply device according to a second exemplary embodiment.

In the present invention, uneven groove shape 35 is not limited to the configuration of FIG. 3. For example, in power supply device 200 according to a second exemplary embodiment, as illustrated in a schematic cross-sectional view of FIG. 4, the groove shape formed in covering part 32B instead of flat plate 31B of insulating member 30B is uneven in which step 35B is formed toward an opening surface. Forming the unevenness stepwise in this manner makes it possible to secure a space for storing dew condensation water at a position separated from a gap between the side surface of the battery stack and insulating member 30, and to more effectively prevent suction of dew condensation water due to a capillary phenomenon between the side surface of the battery stack and insulating member 30.

Third Exemplary Embodiment

Figure 5:
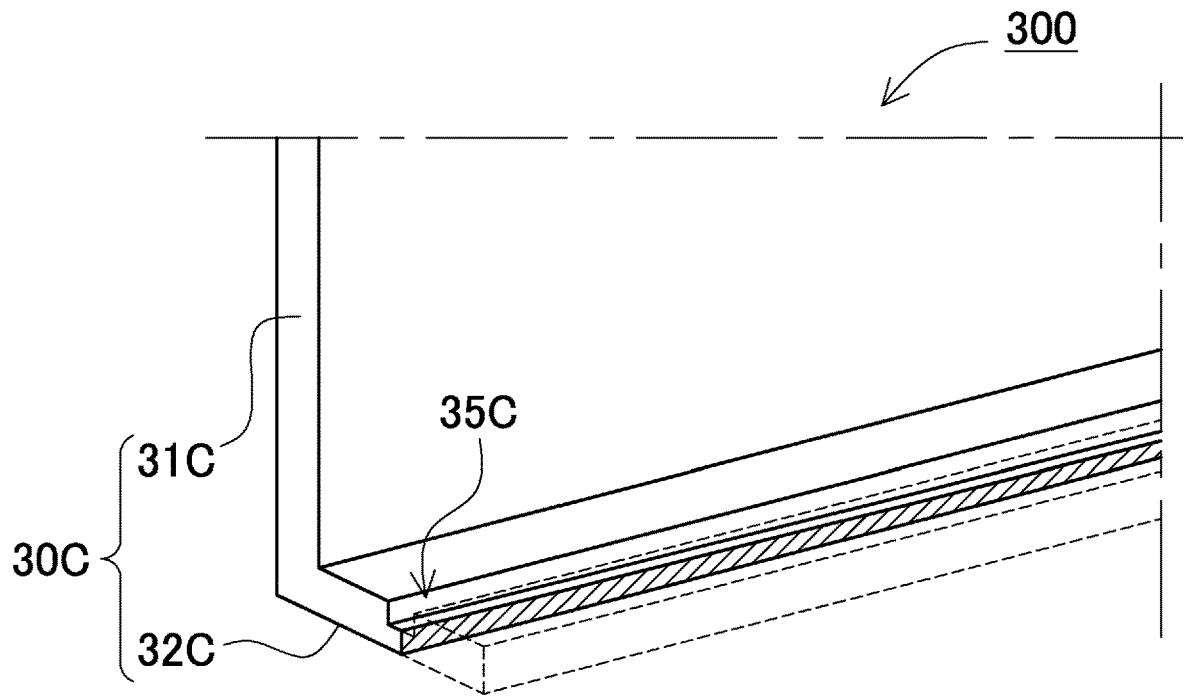
FIG. 5 is an enlarged schematic cross-sectional perspective view illustrating a groove shape formed in an insulating member of a power supply device according to a third exemplary embodiment.

Further, the unevenness is not limited to the configuration formed horizontally, and may be inclined. For example, it may be formed in a linear shape inclined with respect to an extending direction of flat plate 31. As a result, a downward gradient is formed, and dew condensation water can be guided in a direction defined by the downward gradient and can be safely discharged from the power supply device. For example, in power supply device 300 according to a third exemplary embodiment, as illustrated in a schematic cross-sectional perspective view of FIG. 5, uneven groove shape 35C formed in covering part 32C instead of flat plate 31C of insulating member 30C is formed to have a downward gradient in a right direction in the drawing. As a result, it is possible to discharge the accumulated dew condensation water from insulating member 30 along the downward gradient of groove shape 35c while preventing the crawling up due to the capillary phenomenon by groove shape 35C.

Fourth Exemplary Embodiment

Figure 6:
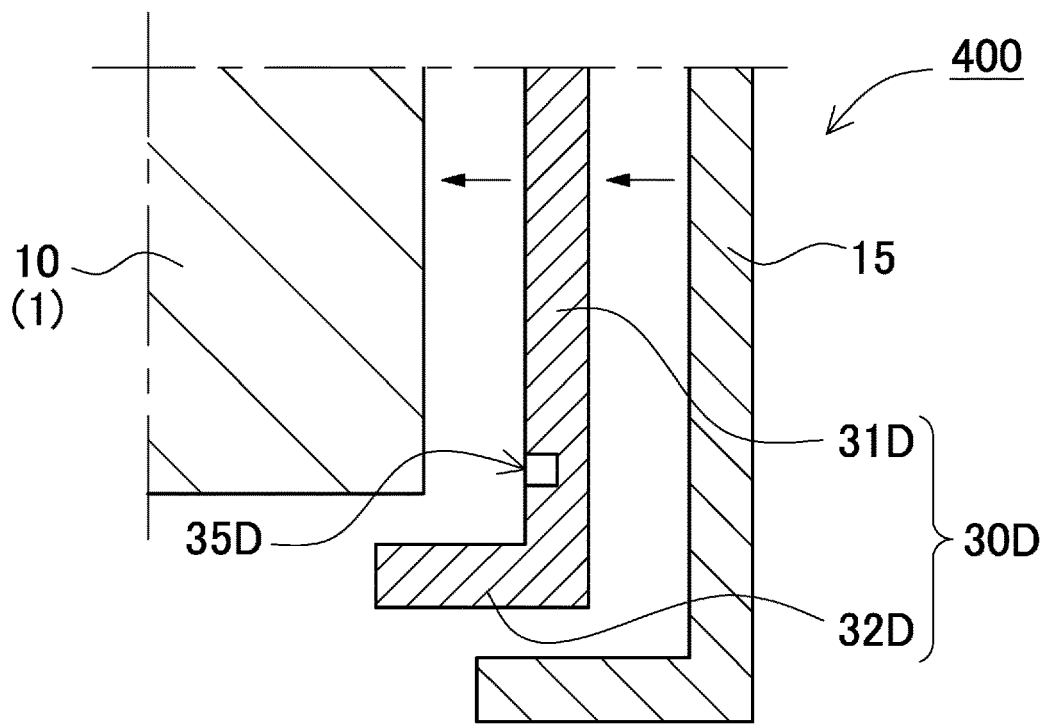
FIG. 6 is an enlarged schematic cross-sectional view illustrating an interface between a battery stack and an insulating member of a power supply device according to a fourth exemplary embodiment.

Although an example in which groove 33 is provided in covering part 32 has been described in the above examples, the present invention does not limit a part where the capillary phenomenon blocking structure is provided to the covering part, and the groove can be provided at any position on the path where the dew condensation water may cause unintended conduction due to the capillary phenomenon. For example, in power supply device 400 according to a fourth exemplary embodiment, as illustrated in a schematic sectional view of FIG. 6, groove shape 35D is provided as the capillary phenomenon blocking structure in a part of flat plate 31D instead of covering part 32D of insulating member 30D. This prevents dew condensation water from flowing along flat plate 31D and climbing up the side surface of battery stack 10.

Groove shape 35 is preferably provided below flat plate 31. As a result, the crawling up of the dew condensation water is suppressed below flat plate 31, the diffusion of the dew condensation water is suppressed, and the safety is further enhanced.

Fifth Exemplary Embodiment

Figure 7:
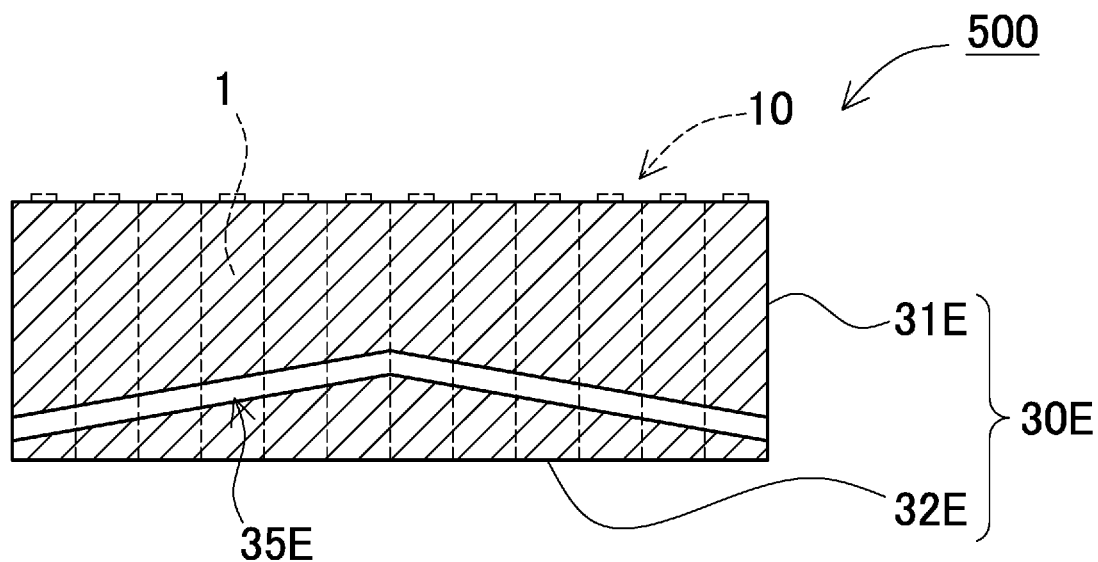
FIG. 7 is an enlarged schematic cross-sectional view illustrating a groove shape formed in an insulating member of a power supply device according to a fifth exemplary embodiment.

As described above, the inclined surface can be formed in the capillary phenomenon blocking structure such as the unevenness. Here, the inclined surface is not limited to one that is linearly inclined in one direction, and a plurality of inclined surfaces may be provided. For example, as power supply device 500 according to a fifth exemplary embodiment, in insulating member 30E illustrated in a schematic cross-sectional view of FIG. 7, not covering part 32E but flat plate 31E is provided with groove shape 35E having an inclined surface with a downward gradient to the left and right in a mountain shape. As a result, the dew condensation water can be discharged to the left and right of insulating member 30E in the drawing, and more smooth discharge can be expected by shortening a path length for discharge.

Sixth Exemplary Embodiment

Figure 8:
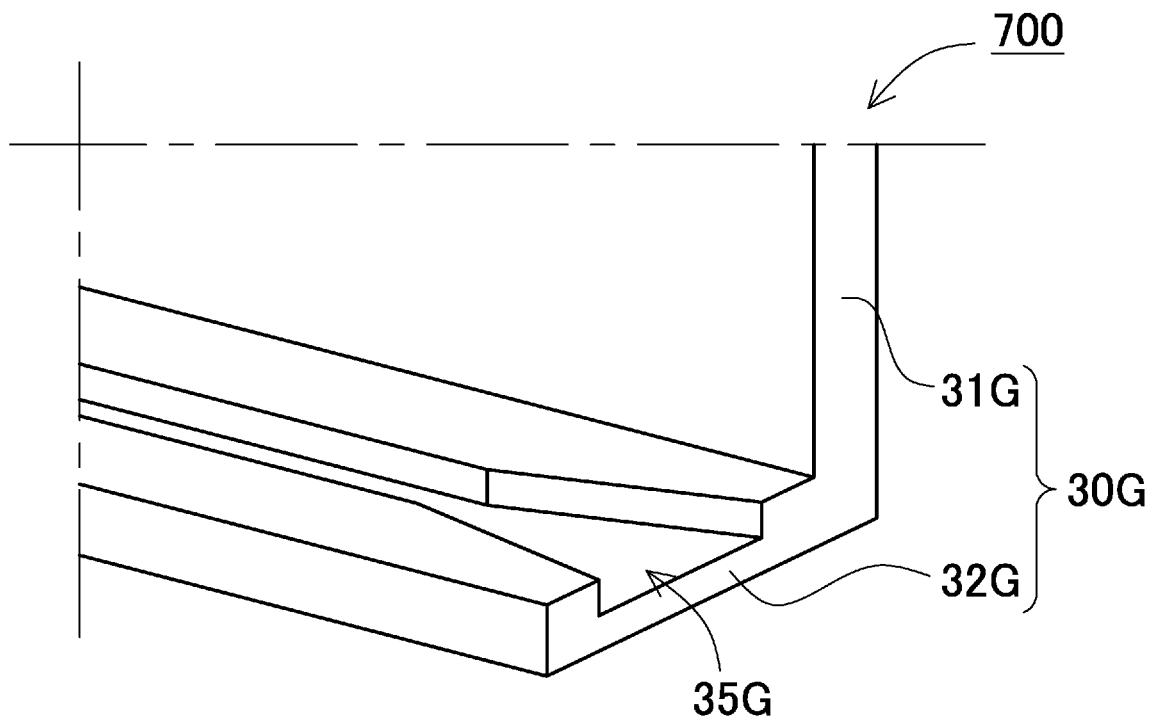
FIG. 8 is an enlarged schematic cross-sectional view illustrating a groove shape formed in an insulating member of a power supply device according to a sixth exemplary embodiment.

Further, the groove is not limited to a configuration in which the groove is extended with a constant width, and a partially wide part may be provided. For example, in an example illustrated in a schematic cross-sectional view of FIG. 8 as power supply device 700 according to a seventh exemplary embodiment, in covering part 32G of insulating member 30G, groove shape 35G is formed so as to expand in a discharge direction. Accordingly, dew condensation water can be more easily discharged from a gap between flat plate 31G of insulating member 30G and the battery stack.

Further, insulating member 30 may form a water-repellent film on a part or the entire surface thereof. Generally, the capillary phenomenon is considered to have a large influence when the liquid wets a tube, that is, when an adhesion force is large, and thus the capillary phenomenon can be suppressed by enhancing the water repellency.

With such a configuration, even in a case where a drainage path for draining dew condensation water is small, for example, even in a case where a depth of the groove is low and a width is narrow, the speed of draining can be promoted. Further, since the water can be efficiently drained, the power supply device can be downsized. Furthermore, when a certain amount of dew condensation water is accumulated due to surface tension, the dew condensation water cannot be discharged and stays inside the power supply device in some cases. On the other hand, discharge can be promoted by using the capillary phenomenon, and it is possible to obtain an advantage that the dew condensation water can be discharged early from a state where the amount of dew condensation water is small.

Power supply device 100 described above can be used as a power source for a vehicle that supplies electric power to a motor that causes an electric vehicle to travel. As an electric vehicle equipped with power supply device 100, electric vehicles such as a hybrid automobile and a plug-in hybrid automobile that travel with both an engine and a motor, or an electric automobile that travels only with a motor can be used, and the power supply device is used as a power source for these vehicles. Note that an example will be described in which a large-capacity, high-output power supply device where a large number of power supply devices 100 described above are connected in series or in parallel in order to obtain electric power for driving an electric vehicle and a necessary controlling circuit is further added is constructed.

(Power Supply Device for Hybrid Automobile)

Figure 9:
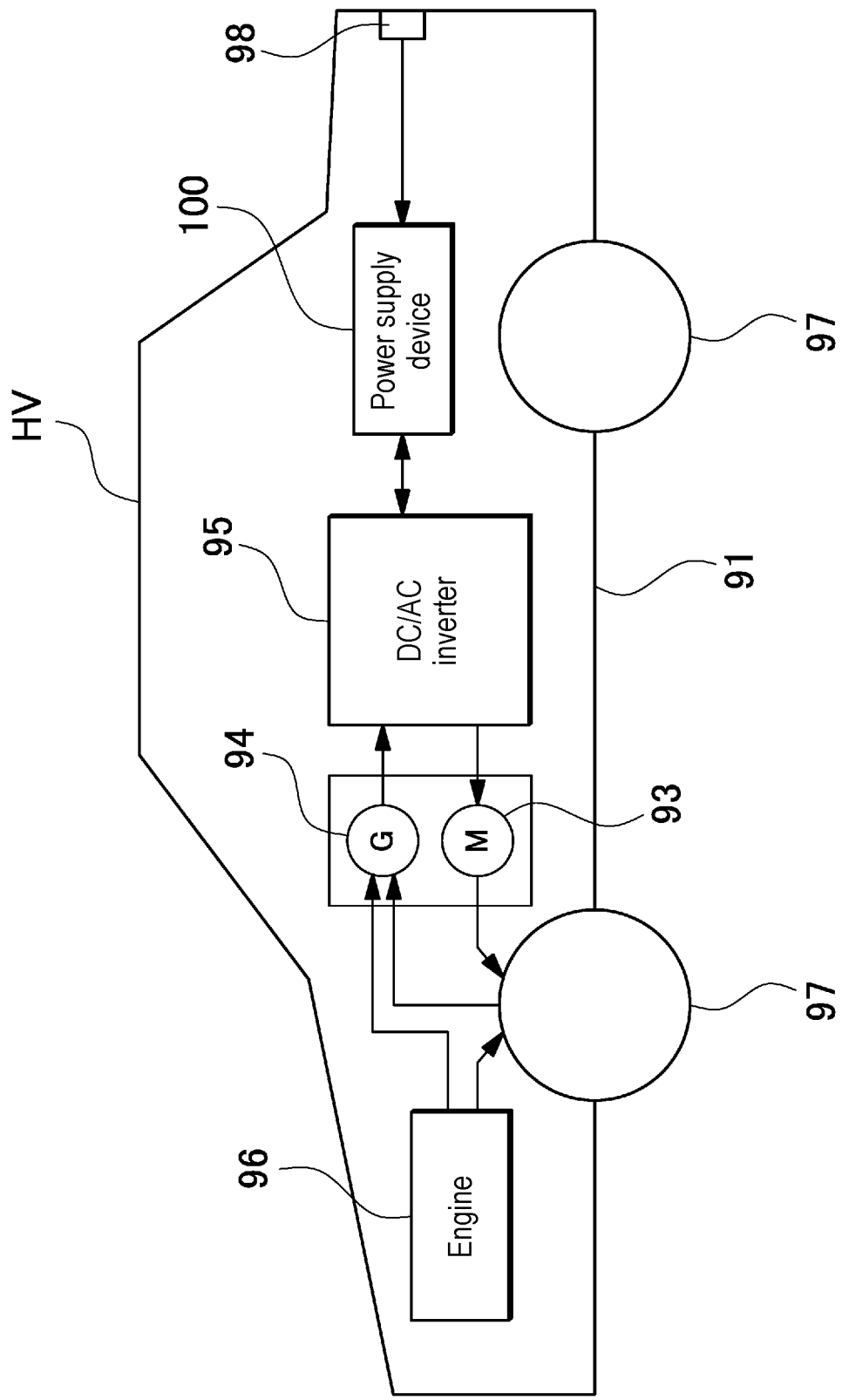
FIG. 9 is a block diagram illustrating an example in which a power supply device is mounted on a hybrid automobile that travels by an engine and a motor.

FIG. 9 illustrates an example in which power supply device 100 is mounted on a hybrid automobile that travels by both an engine and a motor. Vehicle HV on which power supply device 100 illustrated in this drawing is mounted includes vehicle body 91, engine 96 and motor 93 for traveling that cause vehicle body 91 to travel, wheels 97 that are driven by engine 96 and motor 93 for traveling, power supply device 100 that supplies electric power to motor 93, and power generator 94 that charges a battery of power supply device 100. Power supply device 100 is connected to motor 93 and power generator 94 via DC/AC inverter 95. Vehicle HV travels by both motor 93 and engine 96 while charging and discharging the battery of power supply device 100. Motor 93 is driven in a region where engine efficiency is low, for example, during acceleration or low-speed traveling, and causes the vehicle to travel. Motor 93 is driven by electric power supplied from power supply device 100. Power generator 94 is driven by engine 96 or by regenerative braking generated at the time of applying braking to the vehicle, and charges the battery of power supply device 100. Note that, as illustrated in FIG. 9, vehicle HV may include charging plug 98 for charging power supply device 100. By connecting charging plug 98 to an external power source, power supply device 100 can be charged.

(Power Supply Device for Electric Automobile)

Figure 10:
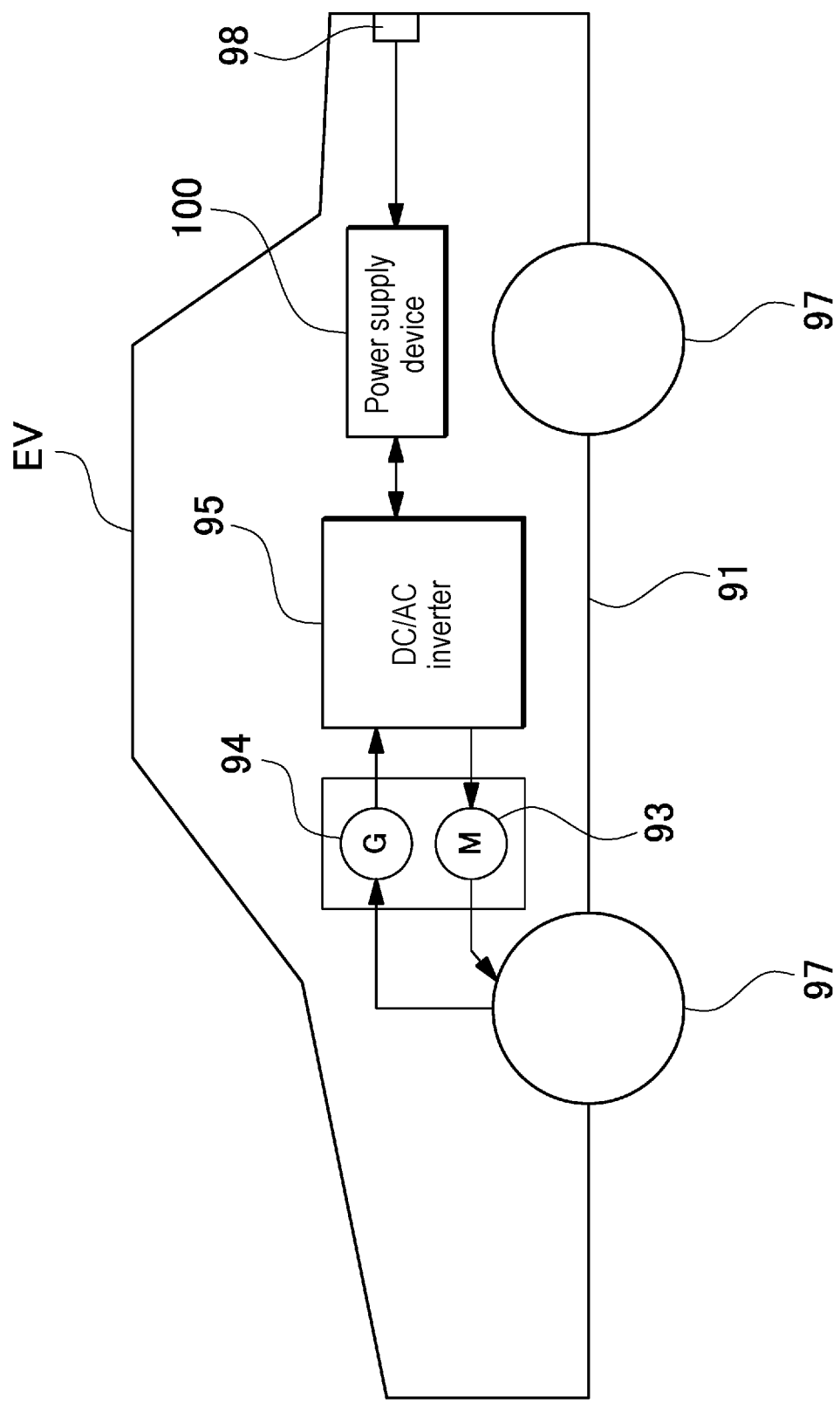
FIG. 10 is a block diagram illustrating an example in which a power supply device is mounted on an electric automobile that travels only by a motor.

FIG. 10 illustrates an example in which power supply device 100 is mounted on an electric automobile that travels only by a motor. Vehicle EV on which power supply device 100 illustrated in this drawing is mounted includes vehicle body 91, motor 93 for traveling that causes vehicle body 91 to travel, wheels 97 that are driven by motor 93, power supply device 100 that supplies electric power to motor 93, and power generator 94 that charges a battery of power supply device 100. Power supply device 100 is connected to motor 93 and power generator 94 via DC/AC inverter 95. Motor 93 is driven by electric power supplied from power supply device 100. Power generator 94 is driven by an energy at the time of applying regenerative braking to vehicle EV and charges the battery of power supply device 100. Further, vehicle EV includes charging plug 98, and power supply device 100 can be charged by connecting charging plug 98 to an external power source.

(Power Supply Device for Power Storage Device)

Figure 11:
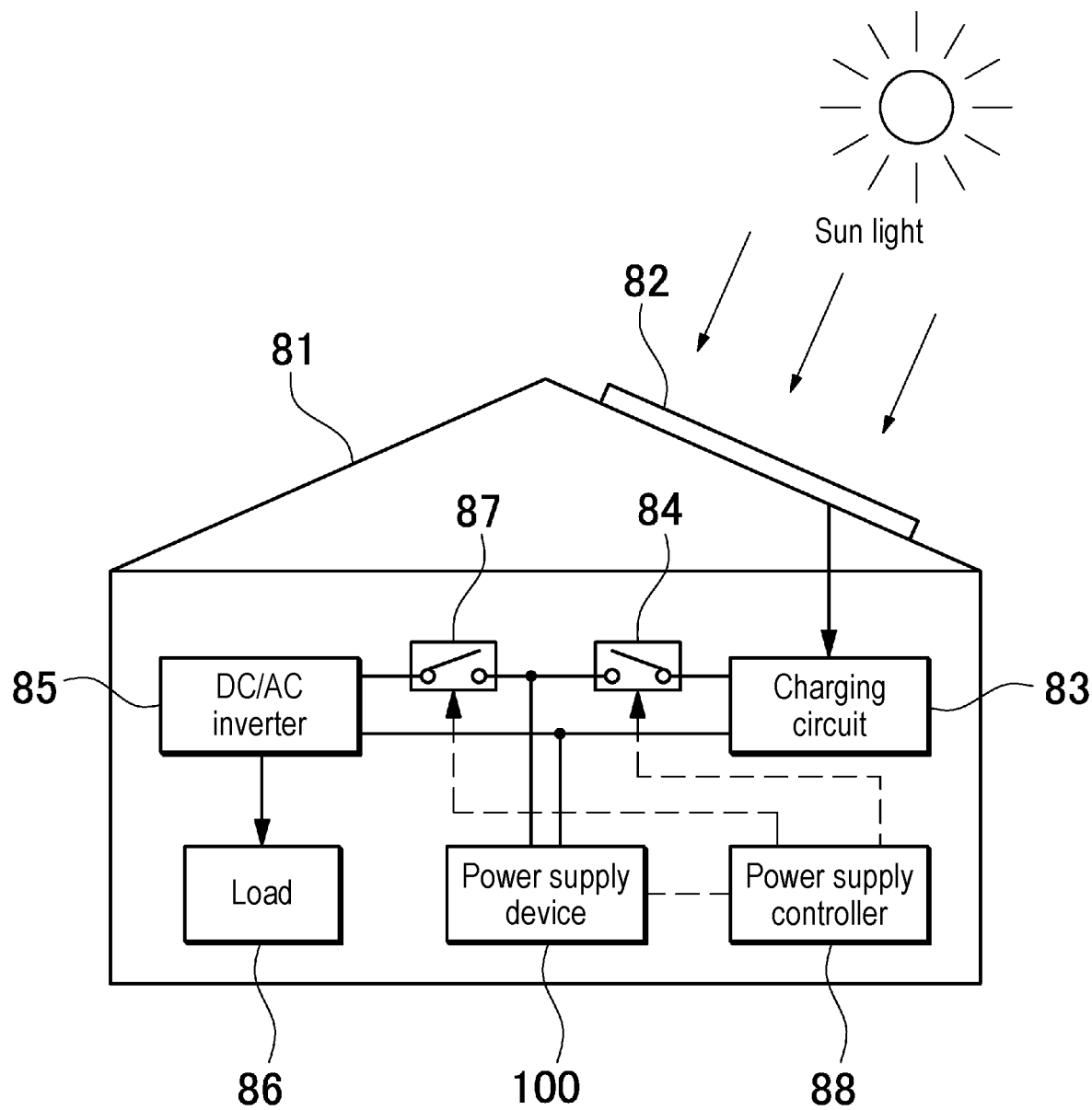
FIG. 11 is a block diagram illustrating an example of application to a power supply device for power storage.

Further, the present invention does not limit the application of the power supply device to a power source for a motor that causes a vehicle to travel. The power supply device according to the exemplary embodiment can be used also as a power source for a power storage device that charges a battery with electric power generated by solar power generation, wind power generation, or the like, and stores electricity. FIG. 11 illustrates a power storage device that charges a battery of power supply device 100 with solar battery 82 and stores electricity.

The power storage device illustrated in FIG. 11 charges the battery of power supply device 100 with electric power generated by solar battery 82 disposed on a roof, a rooftop, or the like of building 81 such as a house or a factory. In this power storage device, the battery of power supply device 100 is charged by charging circuit 83 using solar battery 82 as a charging power source, and thereafter, electric power is supplied to load 86 via DC/AC inverter 85. Therefore, the power storage device includes a charge mode and a discharge mode. In the power storage device illustrated in the figure, DC/AC inverter 85 is connected to power supply device 100 via discharging switch 87, and charging circuit 83 is connected to power supply device 100 via charging switch 84. Discharging switch 87 and charging switch 84 are turned on and off by power supply controller 88 of the power storage device. In the charge mode, power supply controller 88 turns on charging switch 84 and turns off discharging switch 87 to allow charging from charging circuit 83 to power supply device 100. Further, when charging is completed and the battery is fully charged or when the battery is in a state where a capacity of a predetermined value or more is charged, power supply controller 88 turns off charging switch 84 and turns on discharging switch 87 to switch the mode to the discharge mode and allows discharging from power supply device 100 to load 86. Furthermore, when necessary, the power supply controller can turn on charging switch 84 and turn on discharging switch 87 to supply electricity to load 86 and charge power supply device 100 simultaneously.

Further, although not illustrated, the power supply device can be used as a power source for a power storage device that stores electricity by charging a battery using midnight electric power at nighttime. The power supply device that is charged with midnight electric power is charged with the midnight electric power that is surplus electric power generated by a power station, and outputs the electric power during the daytime when an electric power load increases, which can limit peak electric power during the daytime to a small value. Furthermore, the power supply device can also be used as a power source charged with both an output of a solar battery and midnight electric power. This power supply device can effectively utilize both electric power generated by the solar battery and the midnight electric power, and can efficiently store power in consideration of weather and power consumption.

The power storage system as described above can be suitably used in applications such as a backup power supply device that can be installed in a computer server rack, a backup power supply device for radio base stations for cellular phones and the like, a power storage device combined with a solar battery such as a power storage power source for homes and factories or a power source for street lights, and a backup power source for traffic lights and traffic indicators on roads.

INDUSTRIAL APPLICABILITY

The power supply device according to the present invention, and a vehicle and a power storage device including the power supply device can be suitably used as a power source for a large current, which is used for a power source of a motor for driving an electrically-driven vehicle such as a hybrid automobile, a fuel cell automobile, an electric automobile, or an electric motorcycle. Examples include a power supply device for a plug-in hybrid electric automobile and a hybrid electric automobile that can switch between an EV travelling mode and an HEV travelling mode, an electric automobile, and the like. Further, the present invention can be appropriately used for applications such as a backup power supply device that can be mounted on a rack of a computer server, a backup power supply device for a radio base station such as a cellular phone, a power source for power storage for home and factory use, a power source for street lamps, and the like, a power storage device combined with a solar battery, and a backup power source for traffic lights and the like.

REFERENCE MARKS IN THE DRAWINGS

100, 200, 300, 400, 500, 700: power supply device
1: battery cell
1X: terminal surface
1a: outer covering can
1b: sealing plate
1c: gas discharge valve
2: electrode terminal
10: battery stack
15: fastening member
15a: fastening main surface
15b: bent piece
15f: bolt
16: insulating spacer
17: end surface spacer
20: end plate
30, 30B, 30C, 30D, 30E, 30G: insulating member
31, 31B, 31C, 31D, 31E, 31G: flat plate
32, 32B, 32C, 32D, 32E, 32G: covering part
33: groove
35, 35C, 35D, 35E, 35G: groove shape
36: step
40: cover assembly
81: building
82: solar battery
83: charging circuit
84: charging switch
85: DC/AC inverter
86: load
87: discharging switch
88: power supply controller
91: vehicle body
93: motor
94: power generator
95: DC/AC inverter
96: engine
97: wheel
98: charging plug
HV, EV: vehicle

The invention claimed is:

1. A power supply device comprising:
a battery stack body including a plurality of battery cells, the plurality of battery cells being stacked, each of the plurality of battery cells including an electrode terminal disposed on a top surface of the each of the plurality of battery cells;
a pair of end plates that cover both end surfaces in a stacking direction of the battery stack;
a fastening member that fastens the pair of end plates to each other; and
an insulating member interposed between a side surface of the battery stack and the fastening member,
wherein the insulating member includes a groove extending in the stacking direction of the battery stack on a surface facing the battery stack,
the insulating member includes a flat plate covering the side surface of the battery stack and a covering part covering a bottom surface of the battery stack, and the flat plate and the covering part extend in the stacking direction of the battery stack,
the groove is provided on a surface of the covering part facing the battery stack, and
the covering part does not extend across an entire width of the battery stack in a direction perpendicular to the stacking direction.

2. The power supply device according to claim 1, wherein the groove including a width in which dew condensation water is sucked due to a capillary phenomenon.

3. The power supply device according to claim 2, wherein the groove including a width of 0.01 mm to 1.0 mm.

4. The power supply device according to claim 1, wherein the insulating member includes a water-repellent coating film on a part or an entire surface of the insulating member.

5. The power supply device according to claim 1, wherein the groove includes a depth at middle is deeper than those at both ends.

6. The power supply device according to claim 1, wherein the groove includes opposite end parts along a length of the insulating member, each of at least one of the opposite end parts of the groove having a width increasing toward a corresponding end of the groove.

7. The power supply device according to claim 1, wherein the groove is also provided on a surface of the flat plate facing the battery stack.

8. The power supply device according to claim 1, wherein the groove includes a linear shape inclined with respect to an extending direction of the flat plate.

9. A vehicle including the power supply device according to claim 1, the vehicle comprising:
the power supply device;
a motor for traveling that is supplied with electric power from the power supply device;
a vehicle body on which the power supply device and the motor are mounted; and
wheels that are driven by the motor to cause the vehicle body to travel.

10. A power storage device including the power supply device according claim 1, the power storage device comprising:
the power supply device; and
a power supply controller that controls charging and discharging of the power supply device,
wherein the power supply controller enables charging of each of the battery cells with electric power from an outside and controls charging to the battery cell.

* * * * *